United States Patent [19]

Bond et al.

[11] 4,069,020
[45] Jan. 17, 1978

[54] PRODUCTION OF REDUCING GASES

[75] Inventors: Desmond H. Bond; George W. Taggart, both of Dallas; Kurt S. Jaeger, Hurst, all of Tex.

[73] Assignee: Ford, Bacon & Davis Texas Inc., Garland, Tex.

[21] Appl. No.: 672,409

[22] Filed: Mar. 31, 1976

Related U.S. Application Data

[62] Division of Ser. No. 508,671, Sept. 23, 1974, Pat. No. 3,963,443.

[51] Int. Cl.$^2$ .......................... C01B 17/02; F23N 1/02
[52] U.S. Cl. ................................. 23/262; 423/659; 431/90; 432/29; 432/222
[58] Field of Search ................ 23/262; 423/573, 574, 423/659; 431/12, 90, 174, 175, 284, 285, 353; 432/29, 36, 222

[56] References Cited

U.S. PATENT DOCUMENTS

| | | | |
|---|---|---|---|
| 2,174,663 | 10/1939 | Keller | 236/15 BD X |
| 2,408,114 | 9/1946 | Urqubart | 431/90 X |
| 2,650,154 | 8/1953 | Anderson | 23/262 X |
| 3,219,415 | 11/1965 | Hensley | 23/262 X |
| 3,376,098 | 4/1968 | Pryor | 431/12 X |
| 3,592,602 | 7/1971 | Palm | 23/262 UX |
| 3,661,534 | 5/1972 | Reed | 23/262 |

Primary Examiner—Joseph Scovronek
Attorney, Agent, or Firm—Richards, Harris & Medlock

[57] ABSTRACT

A process for the production of reducing gases and apparatus for use therein is provided. A unique gas mixer and reactor is provided which can be used to effect substoichiometric reactions of gaseous reactants to produce a hydrogen rich gas. The gases which are to be reduced are then admixed with the hydrogen rich gas and the gaseous mixture is passed to a catalytic reactor where the reduction reaction takes place.

6 Claims, 5 Drawing Figures

PRODUCTION OF REDUCING GASES

BACKGROUND OF THE INVENTION

This is a divisional of copending U.S. patent application, Ser. No. 508,671, filed Sept. 23, 1974, now U.S. Pat. No. 3,963,443, issued June 15, 1976.

This invention relates to gas mixers and reactors. In another aspect, this invention relates to gas burners. Still another aspect of this invention relates to a novel method and means for controlling the combustion of gaseous components.

Apparatus for reacting and combusting gaseous components wherein the relative quantities of gaseous reactants must be precisely controlled, such as substoichiometric burners, require not only means to effect an efficient mixing operation but sufficient flow control features to allow proper metering of the reactant materials. Most gas burners do not provide these features. Furthermore, conventional such burners and the like are subject to heat and/or chemical deterioration and do not provide a good visual contact with the combustion zone.

SUMMARY OF THE INVENTION

According to one embodiment of the subject invention a gas mixer and reactor is provided which comprises an elongated gas flow chamber with nozzle means at its inlet end for introducing a uniform flow of gas about its inner periphery, a thermal reaction zone operatively communicating with the outlet end thereof and a second nozzle means positioned about the outlet end of said gas flow chamber to direct at least one gaseous component inwardly into the gas flow chamber at an angle toward the thermal reaction chamber. The positioning of the first and second nozzle means provides for thorough intermixing of the gaseous components by the time they reach the thermal reaction zone, and the elongated configuration of the reactor allows for visual contact in the combustion zone while minimizing unwanted thermal convection and radiation thereto and chemical deterioration thereof. According to a preferred embodiment of said one embodiment, the thermal reaction zone comprises a shortened tubular member having its inlet end contiguous with the outlet of the gas flow chamber, and an inset annular step at the opposite end thereof thereby forming the outlet opening thereof.

According to another embodiment of the subject invention a novel process is provided for admixing and reacting gaseous components which comprises introducing a first gaseous component into an elongated gas flow zone at points uniformly about the inner periphery thereof, i.e. radially; flowing the first gaseous component axially through said elongated gas flow zone; injecting a second gaseous component into the first gaseous component as it passes from said elongated gas flow zone from mulitiple points annular of said zone and in the direction of the flow of the first gaseous component causing a thorough mixing of the first and second gaseous components; and passing the first and second gaseous components while admixing into a reaction zone wherein the components are reacted. The process carried out in accordance with this embodiment results in an extremely efficient mixing of the gaseous components while they are reacted. The second gaseous component can comprise one or more reactants. Furthermore, the second gaseous component is injected into the first gaseous component in one of two preferred modes. The first mode includes injecting the second gaseous component generally from annular arranged nozzles positioned near the outlet of the gas flow zone such that their point of impingement will be within mid-portion of the thermal reaction zone. The second preferred mode is to inject the second gaseous component from nozzles positioned around the outlet of the elongated gas flow zone but positioned in a skewed manner such that they will impinge at the point of intersection between above described inset step and the inside wall of the thermal reaction zone of said preferred embodiment.

The process of the above embodiment can be used to effect any gaseous reaction with either stoichiometric or substoichiometric quantities of reactants. For example, in accordance with another embodiment of the subject invention, a light hydrocarbon fuel is combusted with a substoichiometric quantity of air to produce hydrogen containing product stream containing no free carbon which in turn can be used in conventional reducing processes, for example, processes for reducing sulfur compounds.

BRIEF DESCRIPTION OF THE DRAWINGS

This invention can be more easily understood from the study of the drawings in which.

DETAILED DESCRIPTION OF THE INVENTION

Figure 1:
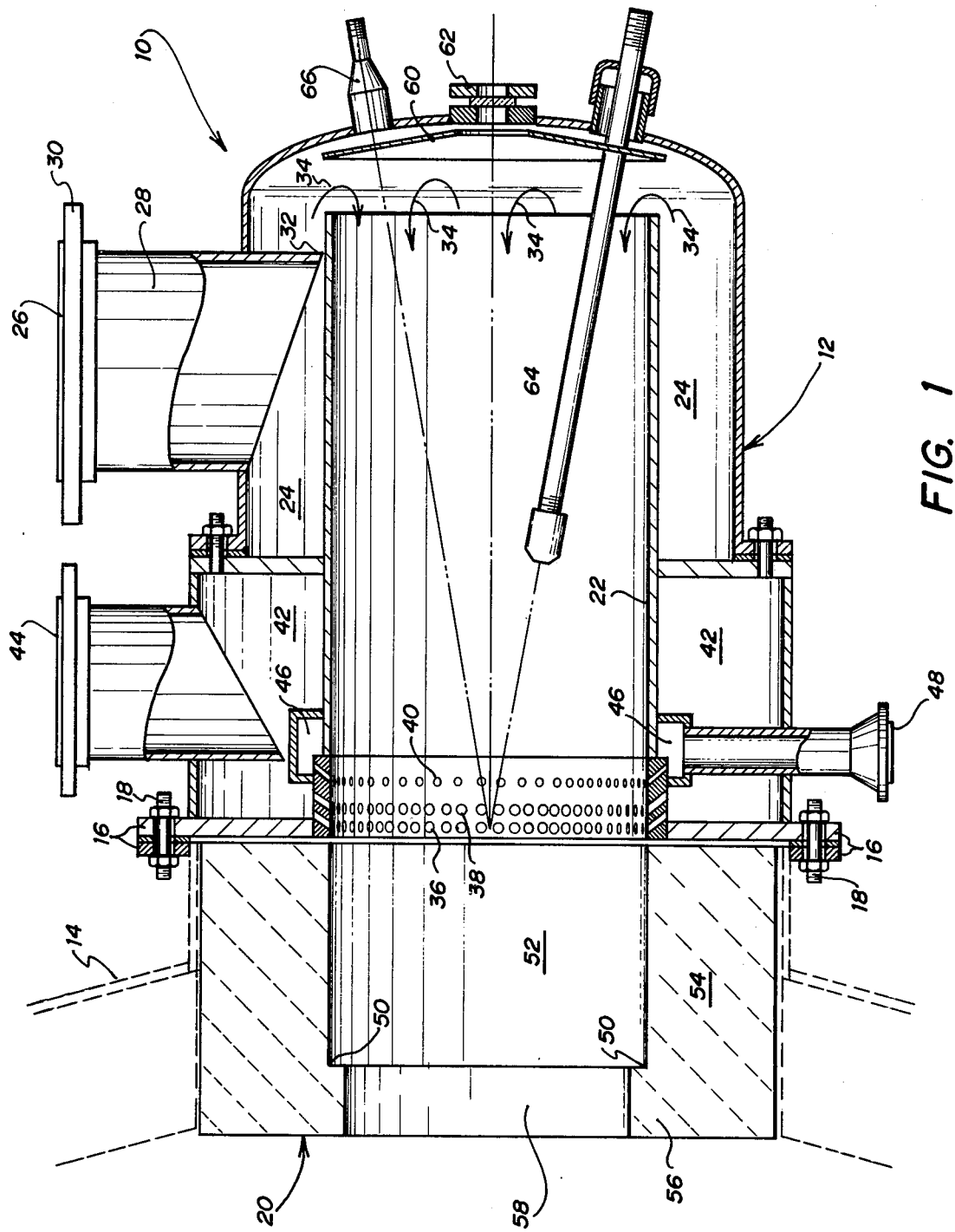
FIG. 1 is a sectional view of a preferred gas mixer and reactor of the subject invention.

Now referring to FIG. 1, a preferred embodiment of the subject invention is shown as gas mixer and reactor 10. Gas mixer and reactor 10 basically comprises a metallic gas injector member 12 which is attached to a furnace 14 via flanges 16 and nut and bolt assemblies 18, and tile member 20 which forms the inlet of furnace 14.

Elongated gas flow chamber 22 is positioned within gas injector member 12 and communicates with gas supply manifold 24 on its inlet end and with tile member 20 on its outlet end. It is noted that elongated gas flow chamber 22 can have any convenient cross-sectional configuration such as for example oval, rectangular or square, but it is preferred that it have a circular cross-sectional configuration and comprise a cylindrical shape. Therefore, elongated gas flow chamber 22 will hereinafter be described as having a generally circular cross-sectional area. Gas supply manifold 24 is positioned around the first end of elongated gas flow chamber 22 and communicates with gas inlet port 26. Gas inlet port 26 basically comprises a cylindrical inlet member 28 with suitable connecting flange 30. The internal end 32 of cylindrical member 28 extends to a point closely adjacent to the sidewall of elongated gas flow chamber 22 and is cut in a tapered manner as shown in the drawings to provide a baffle or is otherwise baffled to assure that gas passing through the inlet port 26 will uniformly fill the manifold 24 and pass into the interior of the elongated gas flow chamber 22, radially, (in an annular flow path as illustrated by arrows 34). It is noted that in some instances the baffle can be totally eliminated, if desired.

Three rows of apertures 36, 38 and 40 are positioned about the outlet end of elongated gas flow chamber 22. As shown, nozzle apertures 36 and 38 communicate with annular gas manifold 42. Gas inlet port 44 which is a similar configuration to gas inlet port 26 operatively communicates with annular gas manifold 42. Similarly, nozzle apertures 40 communicate with annular gas manifold 46 which in turn operatively communicates with gas inlet port 48. As shown, nozzle apertures 36, 38 and 40 are angled toward the interior of tile member 20. In a preferred embodiment nozzle apertures 36, 38 and 40 are angled for impingement at the center line or axis of the reaction chamber 52 within tile member 20. According to an alternate preferred embodiment, nozzles 36, 38 (and 40, if desired) are skewed in relation to one another and directed toward impingement at points 50 within tile member 20. It should be noted that the subject invention can utilize any number of nozzle apertures such as 36, 38 and 40 spaced relative to one another in any desired number of rows, but three rows of such nozzle apertures are shown together with the annular gas manifolds 42 and 46 for illustrative purposes only.

Tile member 20 basically comprises a short cylindrical reaction chamber 52 made from ceramic tile members 54. Inset annular step 56 is positioned at the outlet of reaction chamber 52 and extends inwardly in an annular manner to thereby form an outlet aperture 58 which is smaller in diameter than the interior of reaction chamber 52.

Radiation shield 60 is positioned adjacent the inlet end of elongated gas flow chamber 22 and comprises a dish shaped member having a reflective surface which faces the interior of elongated gas flow chamber 22. Sight port 62 is positioned behind radiation shield 60 on the axis of elongated gas flow chamber 22. Pilot burner 64 extends through the sidewall of gas injector member 12, radiation shield 60, and to a point adjacent the midportion of elongated gas flow chamber 22 as shown in FIG. 1. Furthermore, scanner mount 66 is positioned through the sidewall of gas injector member 12 and in alignment with suitable aperture means through radiation shield 60. As shown in broken lines in FIG. 1 a focal point between the projection of pilot burner 64, sight port 62, and scanner mount 66 exists at the end of elongated gas flow chamber 22.

Figure 2:
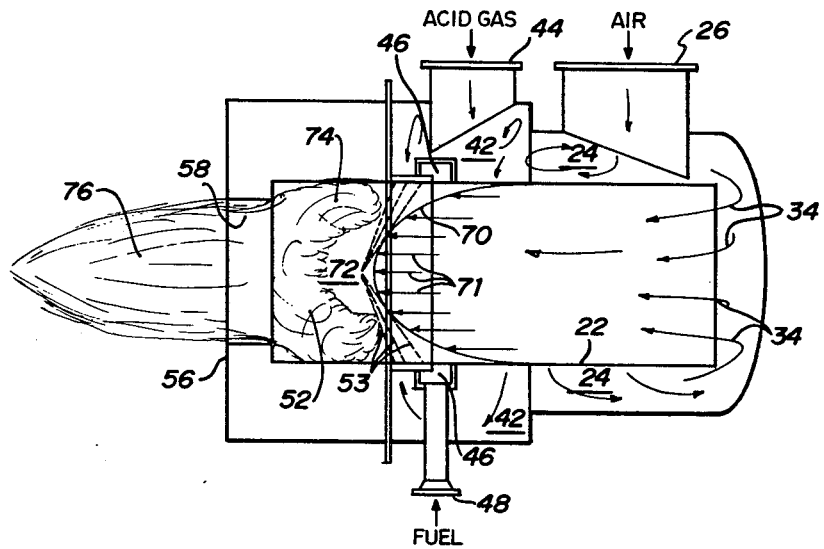
FIGS. 2 through 4 are schematic views showing various modes of operation of the apparatus set forth in FIG. 1.
Figure 3:
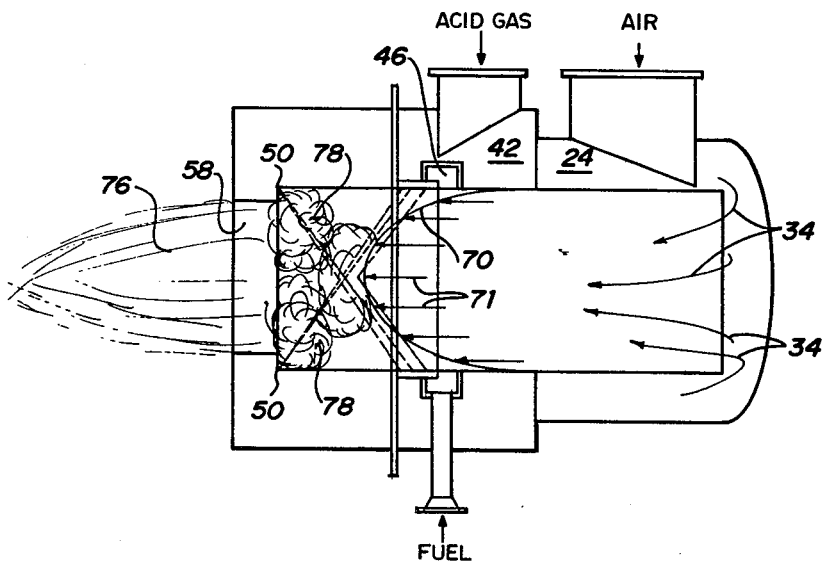
Figure 4:
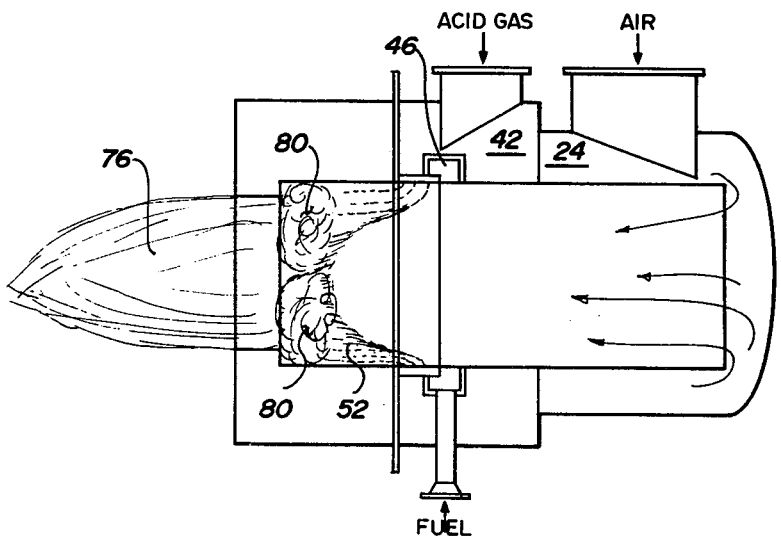

The gas mixer and reactor 10 can be utilized to react various gaseous constituents in three basic modes of operation as illustrated in FIGS. 2, 3 and 4. The three basic modes of operation of gas mixer and reactor 10 will be set forth for illustrative purposes only in relation to the process of forming an $H_2S - SO_2$ mixture from acid gas ($H_2S$ rich gas) for use in a Claus sulfur conversion process. In this process air is preferably delivered to gas manifold 24 via gas inlet port 26, the acid gas is delivered to annular gas manifold 42 via gas inlet port 44 and a fuel gas is delivered (if desired) to gas manifold 46 via gas inlet port 48. The fuel gas need not be delivered at all times during the operation of gas mixer and reactor 10, but FIGS. 2-4 will be described showing the fuel gas being injected into reaction zone 52. Thus, acid gas is delivered from nozzle apertures 36 and 38 while gaseous fuel such in the lower molecular weight hydrocarbon gas is delivered from nozzle apertures 40.

The first mode of operation is shown in FIG. 2 which utilizes relatively high flow rates of all three gaseous streams, and nozzle apertures 36, 38 and 40 are angled in such a manner as to converge on the centerline of the short cylindrical reaction chamber 52, and within reaction chamber 52. The fuel and oxygen are delivered in such ratios as to convert one-third of the hydrogen sulfide within the acid gas stream to sulfur dioxide. Furthermore, increasing amounts of fuel and/or oxygen can be utilized to destroy any other impurities wich may be contained within the hydrogen sulfide rich fuel gas stream. Such impurities include ammonia and other nitrogen, carbon, and hydrogen containing compounds.

As shown in FIG. 2, the nozzle apertures 36, 38 and 40 are directed into the reaction chamber 52 and impinge at the center line or axis of reaction chamber 52 as shown by arrows 33. The air is introduced through gas port 26 and passes around annular gas flow manifold 24 and then radially into the interior of elongated gas flow chamber 22 as shown by arrows 34. The introduction of the air in a uniformly annular manner about the inner periphery of elongated gas flow chamber 22 results in a substantially parabolic velocity front 70 as depicted by flow arrows 71 in FIG. 2. This substantially parabolic velocity front passes through the elongated gas flow chamber 22 into the turbulent region 72 formed by impingement of the acid gas and fuel gas stream within reaction chamber 52 to form a uniform mixture depicted as 74 of air, acid gas and fuel gas which is ignited (initially by the action of the pilot burner 64 not shown in FIG. 2). It is noted that the action of inset annular step 56 on the gas mixture results in further turbulance and further admixing as combustion occurs and the combusting mixture of expanding gases 76 exit via outlet aperture 58.

In the second mode of operation as schematically depicted in FIG. 3, the gas flow rates of all three streams are generally high as described in FIG. 2 but nozzle apertures 36 and 38 and if desired, 40, are skewed and directed toward points 50 which comprises the intersection between inset annular step 56 and the internal periphery of reaction chamber 52. When operating in this mode the air is passed radially inwardly into the interior of elongated gas flow chamber 22 as described in relation to FIG. 2 to form the substantially parabolic velocity front 70. Furthermore, the acid gas passing from nozzle apertures 36 and 38 impinges upon points 50 to form areas of turbulence 78. The nozzle apertures 40 can either be skewed to contact points 50 or merely aimed at the center line of reaction chamber 52 in a manner described above in relation to FIG. 2. As shown in FIG. 3, nozzle apertures 40 are angled to impinge on the center line within reaction chamber 52. The substantially parabolic velocity front of air 70 contacts the points of impingement and turbulence thereby created at 78 to form a uniform mixture of the air and acid gas. The mixture is ignited initially by the action of pilot burner 64 to form the combusting mixture 76 which is passed into the furnace via aperture 58.

The third mode of operation is schematically illustrated in FIG. 4. In this mode of operation the gas flow rates from apertures 36, 38 and 40 is relatively low. As shown, the flow rates of acid gas and fuel gas from nozzle apertures 36, 38 and 40 are not of sufficient velocity to cause impingement either at the center line within reaction chamber 52 or at points 50 opposite the nozzle apertures. The flows from these nozzle apertures merely trails along the inner periphery of reaction chamber 52 with only a small amount of mixing occurring with the air stream until contact is made with inset annular step 56. At this point turbulent areas 80 result to cause intimate admixture of the acid gas, fuel and air. The mixture is ignited and the combusting mixture 76 is passed from the thermal reaction zone via outlet aperture 58. In this mode, with the low flow rates, it is many times necessary to maintain a constant pilot flame emitting from pilot burner 64 (not shown in FIG. 4).

It is noted that in all three modes of operation as described above in relation to FIGS. 2, 3 and 4 the interior of reaction zone 52 is readily viewable via sight port 62 (FIG. 1). In addition, since the gas flows are constantly passing from gas injection member 12 to the interior of the ceramically lined tile member 20, and because of the relatively great distance from the metal parts within gas injector member 12 from reaction chamber 52, thermal convection and heat deterioration of the metal parts within the gas injector member 12 are diminished. In addition, the orientation of elongated gas flow chamber 22 is such that the gases flowing therethrough provide a cooling effect for all metal parts. Furthermore, elongated gas flow chamber 22 is so disposed as to be shielded from radiation. Furthermore, very little corrosive action can occur to the metal parts within the gas injector member 12 since the mixing and combusting operations mainly occur within the tile member 20.

Figure 5:
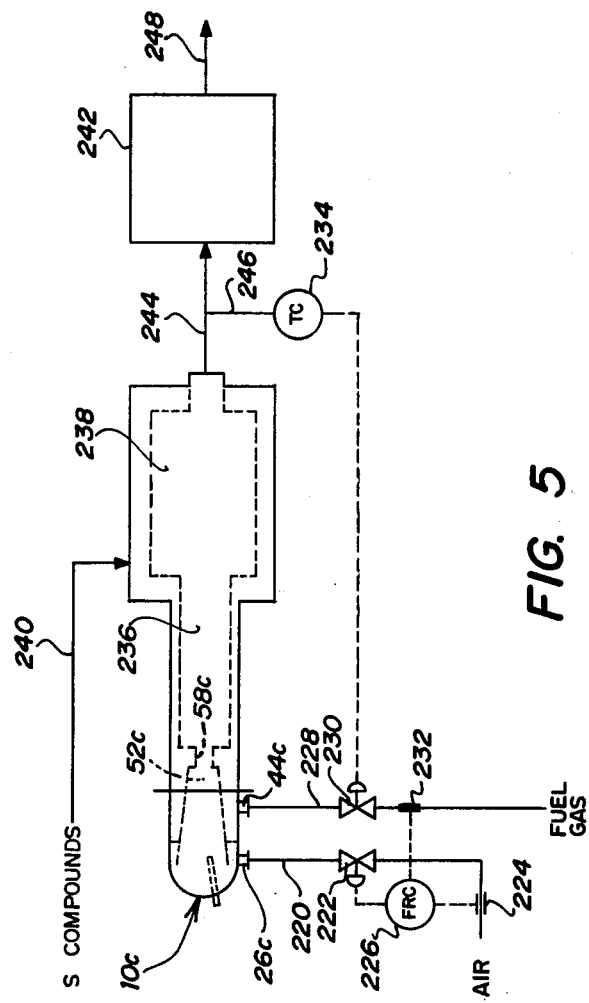
FIG. 5 is a schematic illustration showing the gas mixer and reactor of the subject invention utilized as a hydrogen generator for producing feed stream utilized to reduce sulfur compounds.

Now referring to FIG. 5, another embodiment of this invention is depicted showing gas mixer and reactor 10c furnishing a reducing gas for a catalytic converter of sulfur compounds. As shown in FIG. 5, gas mixer and reactor 10c can be substantially the same as gas mixer and reactor 10 shown in FIG. 1 except that nozzle apertures 40, annular manifold 46 and gas inlet port 48 are not necessary. These components can either be eliminated or gas inlet port 48 merely can be plugged. Thus as shown, gas inlet port 26c operatively communicates with air conduit 220. Air conduit 220 has flow control valve 222 and flow rate sensor 224 operatively disposed therein. Valve 222 is operatively connected to the output of flow ratio controller 226. Flow rate sensor 224 is operatively connected to an input of flow ratio controller 226. Gas inlet port 44c operatively communicates with fuel gas conduit 228. Flow control valve 230 and flow rate sensor 232 are operatively disposed within conduit 228. As shown, flow rate sensor 232 is operatively connected to an input of flow ratio controller 226. Furthermore, valve 230 is operatively connected to the output of temperature controller 234. The outlet 58c communicates with combustion chamber 236. The outlet of combustion chamber 236 communicates with mixing chamber 238. Inlet conduit 240 operatively communicates with the interior of mixing chamber 238 and delivers sulfur containing compounds therein such as the tail gas from a catalytic Claus converter, for example. The outlet of mixing chamber 238 communicates with catalytic reactor 242 via conduit 244. Temperature sensor 246 is operatively disposed within conduit 244 and supplies an input to temperature controller 234 as illustrated in FIG. 5. The hydrogenated product is removed from catalytic converter 242 via conduit 248. Thus again referring to FIG. 5, air is delivered to inlet port 26c via conduit 220 and fuel, which can be a light hydrocarbon fuel gas, such as natural gas is delivered to gas inlet port 44c via conduit 228. The two gases are admixed and ignited within reaction zone 52c in a manner set forth above in the description of FIGS. 1 through 4 and the combusting products are passed through outlet 58c into combustion chamber 236. The ratio of air to fuel is such that fuel is burned to produce hydrogen, oxides of carbon and no free carbon. Thereafter the hot combustion gases which are at a temperature of about 3000° F are admixed with sulfur containing compounds in mixing chamber 238 which are delivered thereto via conduit 240. The resulting admixture is passed into catalytic converter 242 via conduit 244. Temperature controller 234 maintains the temperature of the outlet gases at temperatures in the range from about 500° F to about 600° F. Catalytic converter 242 can contain any conventional hydrogenation catalysts such as cobalt-molybdenum on bauxite. The hydrogenated material is removed from catalytic converter 242 via conduit 248.

As a specific example of a gas mixer and reactor 10c which can be used in the scope of the subject invention, the device can have the following dimensions set forth in the Table below. It is noted that elongated gas flow chamber 22 is illustrated in this embodiment as having a frusto conical shape.

TABLE

| | |
|---|---|
| Inside diameter of: | |
| inlet of elongated gas flow chamber 22 | 14 1/3 inches |
| outlet of elongated gas flow chamber 22 and reaction chamber 52 | 5 7/10 inches |
| Length of elongated gas flow chamber | 13 1/8 inches |
| Length of thermal reaction chamber | 11 1/2 inches |
| Number of nozzle apertures 36 and/or 38 | 17 |
| Diameter of nozzle apertures | 7/32 inch |
| Height of inset annular step | 7/8 inch |
| Width of inset annular step | 3 3/4 inches |

Next, with this reactor 10c, methane is supplied to gas inlet conduit 44c at a rate of 2800 standard cu. ft. per hour and air is supplied to gas inlet port 26c at a rate of 16,000 standard cu. ft. per hour. This will convert approximately 6.0 moles per hour of sulfur compounds in catalytic converters 242 having a bed of cobalt-molybdenum catalyst on bauxite.

It is noted that while the above invention has been described in relation to its preferred embodiments, it is to be understood that various modifications thereof will be apparent to one skilled in the art from the study of this specification and it is intended to cover such modifications as fall within the scope of the appended claims. For example, gas mixer and reactor can be utilized as either a natural or forced draft incinerator, for producing reducing gas for various operations such as smelting and metal working, heat treating and any other processes requiring hydrogen and/or carbon monoxide, and can be used in the production of carbon black and can be used to thermally decompose ammonia to produce hydrogen or with more oxygen to produce high purity nitrogen and in any indirect or direct heating operation and for boilers and many other combinations.

We claim:
1. An apparatus for reducing gaseous compounds comprising:
   a. elongated gas flow chamber having a first end which carries an inlet thereto and a second end which carries an outlet therefor;
   b. a thermal reaction chamber communicating with said outlet of said second end of said elongated gas flow chamber and having its outlet spaced therefrom;

c. an air injection means for injecting air into said elongated gas flow chamber through said inlet thereof toward said outlet thereof, from points uniformly about the inner periphery of said elongated gas flow chamber;

d. gas nozzle means positioned adjacent said second end and around said elongated gas flow chamber and directed into said elongated gas flow chamber and toward said thermal reaction chamber, for injecting fuel gas therewithin;

e. a furnace chamber comprising a chamber with an inlet and an outlet, and having its inlet operatively communicating with said outlet of said thermal reaction chamber;

f. a mixing chamber operatively communicating with the outlet of said furnace chamber and having an inlet means for passing said gaseous compounds to be reduced therewithin, and an outlet; and, g. a catalytic reactor containing a reducing catalyst and conduit means for passing a gas mixture from the outlet of said mixing chamber to said catalytic reactor, and means to withdraw reduced compounds from said catalytic reactor.

2. The apparatus of claim 1 further comprising an inset annular step in said thermal reaction chamber spaced from said outlet of said elongated gas flow chamber, and the opening axial of said inset annular step forming said outlet of said thermal reaction chamber.

3. The apparatus of claim 2 wherein said catalyst comprises cobalt-molybdenum on bauxite.

4. An apparatus for reducing gaseous compounds comprising:

a. an elongated gas flow chamber having a first end which carries an inlet thereto and a second end which carries an outlet therefor;

b. a thermal reaction chamber communicating with said outlet at said second end of said elongated gas flow chamber and having its outlet spaced therefrom;

c. an air injection means for injecting air into said elongated gas flow chamber through said inlet thereof toward said outlet thereof, from points uniformly about the inner periphery of said elongated gas flow chamber;

d. an air flow source operatively connected with said air injection means which includes a valve means and a first flow rate sensing means having an input and an output;

e. gas nozzle means positioned adjacent said second end and around said elongated gas flow chamber and directed into said elongated gas flow chamber and toward said thermal reaction chamber, for injecting fuel gas therewithin;

f. a fuel gas flow source operatively connected to said gas nozzle means which includes a valve means and a second flow rate sensing means having an input and an output;

g. a flow ratio control means operatively connected to the outputs of said first and second flow rate sensing means and to said air flow source and said fuel gas flow source for controlling the relative proportions of air and fuel gas injected into said thermal reaction chamber;

h. a furnace chamber comprising a chamber with an inlet and an outlet, and having its inlet operatively communicating with said outlet of said thermal reaction chamber;

i. a mixing chamber operatively communicating with the outlet of said furnace chamber and having an inlet means for passing said gaseous compounds to be reduced therewithin, and an outlet;

j. a catalytic reactor containing a reducing catalyst and conduit means for passing a gas mixture from the outlet of said mixing chamber to said catalytic reactor, and means to withdraw reduced compounds from said catalytic reactor; and, k. a temperature control means for controlling the temperature of the gaseous compounds passing from said mixing chamber to said catalytic reactor.

5. The apparatus of claim 4 further comprising an inset annular step in said thermal reaction chamber spaced from said outlet of said elongated gas flow chamber, and the opening axial of said inset annular step forming said outlet of said thermal reaction chamber.

6. The apparatus of claim 5 wherein said catalyst comprises cobalt-molybdenum on bauxite.

* * * * *